Oct. 18, 1949.   G. W. WATTLES, JR   2,485,025
DEICER FOR WINDSHIELD WIPERS
Filed Jan. 25, 1945   2 Sheets-Sheet 1
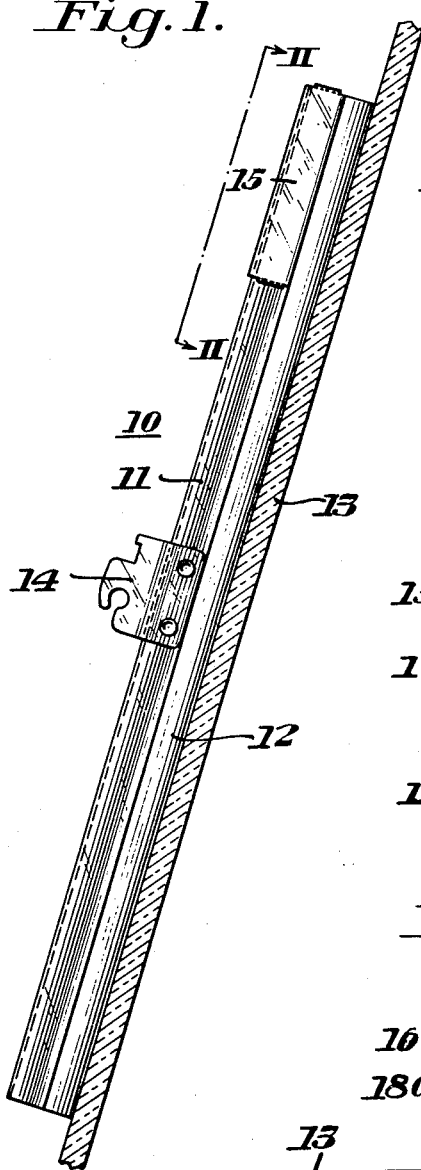
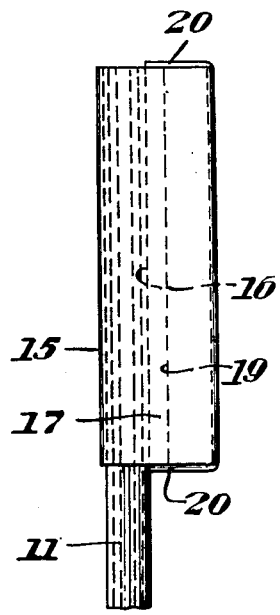
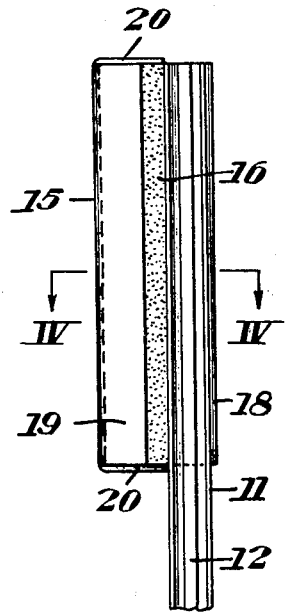
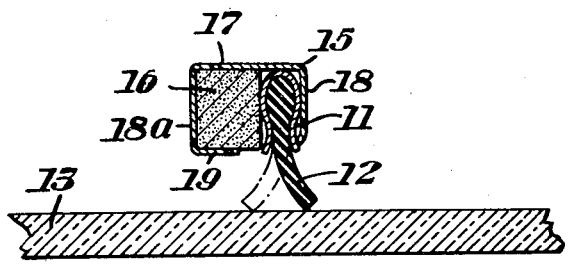
INVENTOR
George W. Wattles, Jr.
by his attorneys Oct. 18, 1949.    G. W. WATTLES, JR    2,485,025
DEICER FOR WINDSHIELD WIPERS
Filed Jan. 25, 1945    2 Sheets-Sheet 2
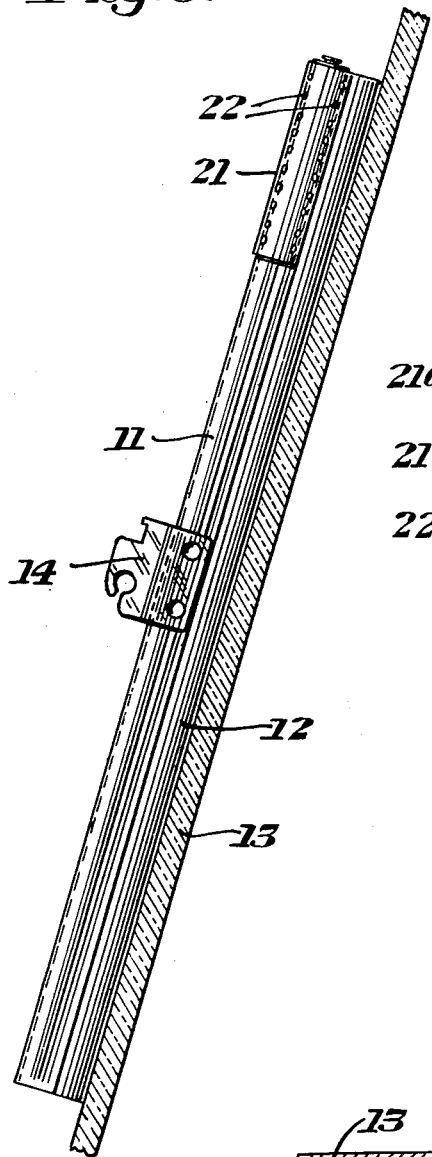
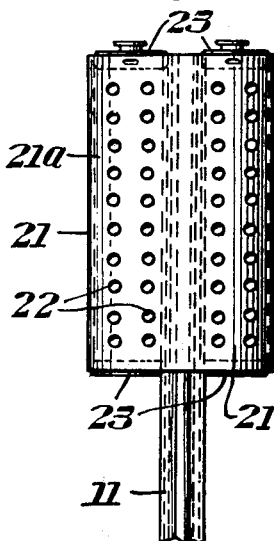
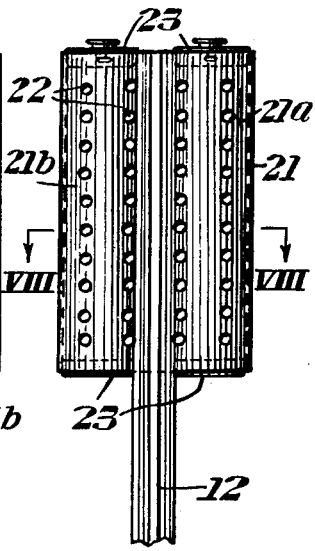
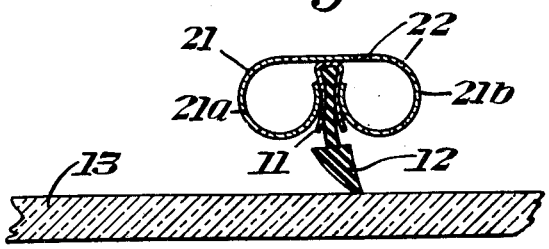
INVENTOR
George W. Wattles, Jr.
by his attorneys Patented Oct. 18, 1949

2,485,025

UNITED STATES PATENT OFFICE 2,485,025

DEICER FOR WINDSHIELD WIPERS

George Warren Wattles, Jr., Pittsburgh, Pa.

Application January 25, 1945, Serial No. 574,470

4 Claims. (Cl. 15—250.3)

This invention relates to windshield wipers and, in particular, to means for preventing the formation of ice on the wiper blade.

It is common knowledge that, in freezing weather, the action of a conventional windshield wiper having a rubber squeegee strip is seriously impaired. Considerable thought and effort have been devoted to the development of means for preventing this result and insuring proper cleaning of the windshield under all atmospheric conditions. One expedient which has been proposed in numerous embodiments is the use of salt either in the form of compressed cakes or sticks or in granular form, in a suitable enclosure, mounted on the wiper blade so as to have contact with the windshield, to take advantage of the lowered freezing point of the solution formed by contact of atmospheric elements with the salt. All these expedients have to do with the removal of ice from the windshield or the prevention of ice formation thereon. They have not functioned effectively because the wiping of the salt block or the container for granular salt on the surface of the windshield leaves a smear which seriously obscures the driver's vision.

I have invented a novel de-icer for windshield wipers which avoids the aforementioned objection to previously proposed expedients and prevents interference with the normal action of the wiper blade by ice formation. I have discovered that the failure of a conventional windshield wiper to operate satisfactorily under freezing conditions is caused not by the formation of ice on the windshield but by the formation of ice particles on the edge of the squeegee strip of the wiper blade. The formation of ice on the windshield itself does not present any serious problem because of the provision common to most modern automobiles for circulating warm air from the car heater against the interior of the windshield. This largely prevents the formation of ice on the outside of the windshield in the area traversed by the wiper blades or promptly causes melting of any ice which may have formed thereon. When ice particles form on the squeegee strip, however, they prevent proper contact of the strip with the exterior surface of the windshield, thereby making impossible the normal wiping action of the strip on the glass.

My invention contemplates provision for so conditioning the squeegee strip as to prevent the formation of ice thereon. In a preferred embodiment, the invention comprises a holder attachable to the wiper blade adapted to receive a charge of salt either in the form of a block or in granular form, and support it out of contact with the windshield but in such position that, when moisture is present, the salt will dissolve and the resulting solution will flow downwardly along the squeegee strip, and melt any ice formed thereon as well as prevent further ice formation. By keeping the salt out of contact with the windshield, I avoid the smearing of the glass and the resulting obscurement of vision which has characterized all previous windshield de-icers utilizing salt.

A complete understanding of the invention may be obtained from the following detailed description and explanation referring to the accompanying drawings illustrating a present preferred embodiment. In the drawings, Figure 1 is a side elevation of a wiper blade having the invention attached thereto, in operative position relative to a windshield which is shown in section;

Figure 2 is a front elevation taken along the plane of line II—II of Figure 1;

Figure 3 is a rear elevation;

Figure 4 is a transverse section taken along the plane of line IV—IV of Figure 3; and Figures 5 through 8 are views similar to Figures 1 through 4 showing a modified form of the invention.

Referring in detail to the drawings, and for the present to Figures 1 through 4, a wiper blade 10 of conventional construction includes a metal channel 11 in which is secured a rubber squeegee strip 12 adapted to make wiping contact with the windshield indicated at 13. The channel 11 has the usual bracket 14 whereby the blade may be mounted on the oscillating arm of a conventional wiper-actuating mechanism.

A holder 15 detachably secured to the channel 11, preferably near the upper end thereof, is adapted to accommodate a salt block 16. The holder 15 is simply a cage formed of sheet metal, so constructed and mounted on the wiper as to support the salt block out of contact with the windshield. As shown in the drawings, the holder includes a front wall 17, sides 18 and 18a and a rear flange 19. Top and bottom flanges 20 extend inwardly from one of the side walls. The holder is preferably made of sheet metal having sufficient stiffness to permit the springing of the side wall 18 so that the wiper blade may enter the space between it and the salt block and thereafter secure the holder in fixed position thereon.

It will be observed that when the holder is applied to the wiper blade, as illustrated, the salt block 16 is supported out of contact with the windshield 13. Because of the relatively open construction of the cage or holder 15, however, snow or sleet in the atmosphere will cause some of the salt to be dissolved and the resulting solution will run down along the squeegee strip 12 by gravity. The presence of the salt solution on the squeegee strip prevents the formation of ice thereon and causes the melting of any ice which may have formed prior to attachment of the holder 15.

The flow of salt solution along the squeegee strip does not interfere with the wiping action thereof and, since the salt block itself is supported out of contact with the windshield, it does not form a smear on the glass which would obscure the driver's vision.

It will be apparent that the invention has numerous advantages over windshield de-icers proposed heretofore. It provides a clear view through the windshield under all atmospheric conditions and prevents interference with the wiping action of the blade as the result of the formation of ice on the squeegee strip thereof. The invention is simple and inexpensive in construction and may be readily attached to the wiper blade when needed or removed therefrom when atmospheric conditions no longer require its use. The amount of salt solution needed to condition the squeegee strip properly is quite small so that the salt block has a relatively long life. The invention is light in weight and thus does not impose any material increase in the load on the actuating mechanism.

Figures 5 through 8 illustrate a modification generally similar to the form of the invention already described. In the modified form, the invention comprises a tubular salt holder 21 having perforations 22 distributed over the wall thereof. While the holder as shown includes a pair of tubular receptacles, designated 21a and 21b, a single one may be used if desired. The holder is composed of sheet metal and is attached to the blade by springing the two receptacles slightly apart. The upper and lower ends of the receptacles are closed as by plugs 23. The plugs in the upper ends are removable to permit filling of the receptacles but the plugs in the lower ends are preferably soldered or otherwise secured in place.

The modified form of the invention is particularly adapted for granular salt. The receptacles may be filled with salt from any convenient supply, either table salt, salt tablets, ice-cream salt or crushed rock salt. In fact, any solid which is sufficiently soluble in water may be employed, and many salts besides sodium chloride are satisfactory for the purpose. The special advantage of the perforated tube holder 21 is that no special form of salt charge such as a block, is required. The salt for charging the receptacles should preferably be coarse enough so that it will not run freely out of the perforations. When moisture is present in the atmosphere, it will enter through the perforations and form a solution for so conditioning the wiper blades as to prevent the formation of ice thereon in the same manner as in the form of the device shown in Figures 1 through 4.

Although I have illustrated and described but a preferred embodiment of the invention, it will be recognized that changes in the details of the construction disclosed may be made without departing from the spirit of the invention or the scope of the appended claims.

I claim:

1. A de-icing appliance for de-icing a windshield wiper blade of the squeegee type characterized by a flexible part having a windshield contacting edge or portion, the flexible part being bent and flexed incident to the wiping action of the blade, and characterized by a stiffened back part contiguous to said flexible part and supporting the flexible part for free wiping action and motion, said appliance having parts for removably engaging only the said back part of said blade and including a charge holder having a portion comprising a chamber enclosing a charge of de-icing material and open to admit atmospheric moisture to said charge, said portion of said appliance when assembled on said blade being disposed closely adjacent to the said back part of said blade and remote from the windshield contacting edge of the flexible part of the blade and substantially out of contact with said flexible part in any normal operative flexed position thereof, said portion of said appliance holding said charge closely adjacent the said back part of the blade and spaced from the windshield and having an opening through which the de-icing material of said charge flows in solution from said portion directly to said blade and may reach the windshield only after first wetting the blade.

2. An appliance as in claim 1 in which the charge holder comprises a tubular receptacle one side of which, when the appliance is attached to a windshield wiper blade, is in contact with the channel forming the back of the blade.

3. An appliance as in claim 1 in which the charge holder comprises a tubular receptacle having end flanges, which receptacle, when the appliance is attached to a windshield wiper blade, is in contact from flange to flange thereof with the channel forming the back of the blade.

4. An appliance as in claim 1 in which the charge holder comprises a pair of tubular receptacles for salt or the like joined by a connecting strip each of which receptacles, when the appliance is attached to a windshield wiper blade, is in contact with the channel forming the back of the blade.

GEORGE WARREN WATTLES, Jr.

REFERENCES CITED

The following references are of record in the file of this patent:

UNITED STATES PATENTS

| Number | Name | Date |
|---|---|---|
| 1,828,715 | Oshei | Oct. 20, 1931 |
| 1,970,497 | De Gregorio | Aug. 14, 1934 |
| 1,977,483 | Koukal | Oct. 16, 1934 |
| 2,085,608 | Rodrick | June 29, 1937 |
| 2,203,071 | Zaiger | June 4, 1940 |